United States Patent [19]

Urawa et al.

[11] Patent Number: 4,751,270

[45] Date of Patent: Jun. 14, 1988

[54] MALEIC ACID-MODIFIED POLYOLEFIN AND PROCESS FOR THE PREPARATION OF THE SAME

[75] Inventors: Shotaro Urawa; Keiichi Nagata; Noboru Yamaguchi, all of Ichihara, Japan

[73] Assignee: Ube Industries, Ltd., Ube, Japan

[21] Appl. No.: 868,932

[22] Filed: May 30, 1986

[30] Foreign Application Priority Data

May 31, 1985 [JP] Japan .................................. 60-119429

[51] Int. Cl.$^4$ .................. C08F 255/02; C08F 255/08; C08F 4/00
[52] U.S. Cl. ..................................... 525/244; 525/285; 525/301
[58] Field of Search .................. 525/285, 301, 244

[56] References Cited

U.S. PATENT DOCUMENTS

| | | | |
|---|---|---|---|
| 3,006,115 | 11/1962 | Smith et al. | 525/244 |
| 4,198,327 | 4/1980 | Matsumoto et al. | 525/78 |
| 4,440,911 | 4/1984 | Inoue et al. | 525/285 |
| 4,506,056 | 3/1985 | Gaylord | 525/244 |
| 4,616,059 | 10/1986 | Matooka et al. | 525/285 |

*Primary Examiner*—Carman J. Seccuro
*Attorney, Agent, or Firm*—Frishauf, Holtz, Goodman & Woodward

[57] ABSTRACT

A maleic acid-modified polyolefin prepared by graft polymerization of maleic anhydride to polyolefin in the presence of a compound having the formula (I):

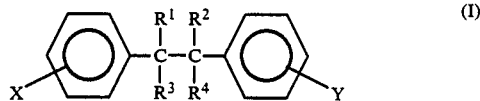

in which each of $R^1$, $R^2$, $R^3$ and $R^4$ is independently an alkyl group having 1–6 carbon atoms; and each of X and Y is independently any one of the hydrogen atom, an alkyl group having 1–6 carbon atoms and a halogen atom. A process for the preparation of said maleic acid-modified polyolefin is also disclosed.

13 Claims, No Drawings

MALEIC ACID-MODIFIED POLYOLEFIN AND PROCESS FOR THE PREPARATION OF THE SAME

BACKGROUND OF THE INVENTION

1. Field of the Invention

This invention relates to a maleic acid-modified polyolefin and a process for the preparation of the same.

2. Description of the Prior Arts

A polyolefin shows various excellent properties such as high heat stability, good chemical resistance and good weather resistance as a thermoplastic resin, and is used widely as a material of various articles such as blow molded products, injection-molded products, films and fibers. Particularly, as for a linear low-density polyethylene and polypropylene, a variety of usage thereof have been proposed because of their excellent physical properties.

The polyolefin finds a variety of usage in various arts as described above. Nevertheless, since the polyolefin has no polar functional group within its molecular structure, it shows extremely poor bonding property and printability, whereby the employment thereof is limited to a certain extent.

To improve the above-mentioned drawbacks, a method of modifying polyolefin with a polar compound such as maleic anhydride through graft-polymerization is generally utilized. In performing the graft-polymerization of maleic anhydride to polyolefin, there have been utilized various methods for initiating the graft-polymerization. For instance, there can be mentioned a method of irradiating a polyolefin with γ rays, X-rays or high-speed cathode rays and a method of using a graft-polymerization initiator such as peroxide. The method of using peroxide is advantageous because no special equipment or device is required for initiating the graft-polymerization reaction. Accordingly, this method is widely used. Examples of the peroxide generally employable include benzoyl peroxide and tert-butyl peroxybenzoate.

In the modification of a polyolefin, it is desired that only the graft-polymeization reaction proceeds so as to graft-polymerize a modifying agent such as maleic acid to polyolefin, with keeping the excellent physical properties of polyolefin.

However, when a peroxide is employed as the reaction initiator, the peroxide serves as a graft polymerization initiator, but at the same time a portion thereof induces crosslinking reaction and decomposition reaction of polyolefin. Because of the crosslinking reaction or decomposition reaction, the inherent physical properties of polyolefin are deteriorated and the resulting modified product is unable to maintain the excellent physical properties of polyolefin. For example, the melt index of the modified product extraordinarily varies and the molecular-weight distribution broadens, so that the adhesiveness and moldability of the resulting modified product become unsatisfactory. As a result, the products produced using such unsatisfactory modified polyolefin are less appreciated on the market.

Further, the present inventors have found that when a linear low-density polyethylene is modified with maleic acid using peroxide as a catalyst, mechanical strength at a low temperature, which is one of the excellent properties of the linear low-density polyethylene, is hardly kept in the obtained modified polyethylene. In adition, peroxide decomposes as the reaction proceeds, and the decomposition product (e.g., butanol or other decomposition product) stains the modified product. For example, the modified product yields odor originating from the decomposition product, or turns to yellow because of the action of the decomposition product (or peroxide itself).

For the purpose of solving the above-mentioned problems caused by the crosslinking reaction or decomposition reaction which is induced by the use of peroxide, a process for the modification of polyolefin with maleic acid in which specific peroxide is employed under the specific conditions is proposed as stated, for example, in Japanese Patent Provisional Publication No. 51(1976)-31791. In this process, the above-mentioned problems are eliminated to a certain extent, but the crosslinking reaction and decomposition reaction of polyolefin are still induced, and thereby the excellent physical properties of polyolefin still decreases. Further, since the mechanism of reaction initiation of peroxide depends on the decomposition of the peroxide, the resulting modified product still not only yields odor caused by the decomposition product but also turns to yellow owing to the action of the decomposition product or peroxide itself.

Furthermore, according to the studies of the present inventors, it is considerably difficult to select the conditions for graft-polymerization of maleic acid to the polyolefin to an extent to approx. 100% by weight, when peroxide is used for the graft-polymerization reaction, and therefore the graft-polymerization reaction is hardly carried out with high efficiency as far as the conventional process is employed in the reaction. In addition, almost all kinds of peroxide including the aforementioned peroxide are very troublesome in handling thereof.

SUMMARY OF THE INVENTION

It is an object of the present invention to provide a maleic acid-modified polyolefin which keeps excellent physical properties of polyolefin employed as the starting material and has the physical properties required for the modified product.

It is another object of the invention to provide a process for the preparation of a maleic acid-modified polyolefin which gives less side reaction such as crosslinking reaction or oxidation reaction in the course of modification of polyolefin with maleic acid so as to attain high graft efficiency of maleic acid.

The maleic acid-modified polyolefin of the present invention is a maleic acid-modified polyolefin prepared by graft polymerization of maleic anhydride to polyolefin in the presence of a compound having the formula (I):

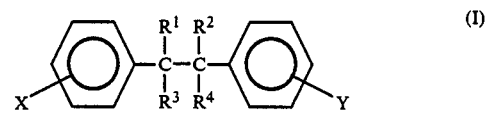

in which each of $R^1$, $R^2$, $R^3$ and $R^4$ is independently an alkyl group having 1–6 carbon atoms; and each of X and Y is independently one selected from the group consisting of the hydrogen atom, an alkyl group having 1–6 carbon atoms and a halogen atom.

The above-described maleic acid-modified polyolefin is easily prepared by the process of the invention comprising graft-polymerization of maleic anhydride to polyolefin in molten state in the presence of the compound having the formula (I).

Since the graft polymerization reaction of the present invention does not rely on the conventional graft polymerization reaction which utilizes oxygen radical generating from the decomposition of peroxide, the side reaction such as crosslinking reaction or oxidation reaction less occurs in the procedure of graft polymerization of the invention. Therefore, the resulting maleic acid-modified polyolefin has such excellent physical properties that the difference of melt index between the obtained modified polyolefin and the polyolefin employed as a starting material is small. For instance, in the case of using a linear low-density polyethylene, the mechanical strength at a low temperature which is one of the excellent properties of the linear low-density polyethylene is introduced into the resulting modified product.

The above-described compound having the formula (I) functions as a radical generator in the course of graft polymerization, and in the final stage of the reaction, most of the compound is recombined to return to the original compound having the formula (I). Therefore, the modified polyolefin produces less odor or less yellowing caused by the decomposition product or the like.

Further, since the graft efficiency of maleic acid (details thereof will be described hereinafter) is high, the adhesion strength of the modified product is prominently higher as compared with polyolefins modified according to the aforementioned conventional methods. Particularly, the maleic acid-modified polyolefin of the invention has prominently high adhesiveness to metals as well as to other materials than metals, such as nylon.

DETAILED DESCRIPTION OF THE INVENTION

The maleic acid-modified polyolefin of the invention is a maleic acid-modified polyolefin prepared by using a compound having the formula (I) as catalyst (i.e., radical generator) in the procedure of modification of polyolefin with maleic acid.

The maleic acid-modified polyolefin of the invention can be prepared by the process described below.

Examples of the olefins employable for the preparation of the maleic acid-modified polyolefin of the invention include homopolymers or copolymers of α-olefin such as ethylene, propylene, butene-1, pentene-1, hexene-1, 4-methyl-pentene-1 and octene-1. In addition to the above-mentioned copolymers, other copolymers having a polar group, such as an ethylene vinyl acetate copolymer, can be employed in the invention.

Preferably employable are polyethylene, polypropylene and a linear low-density polyethylene which is a copolymer of ethylene and a small amount of α-olefin having 3–10 carbon atoms (e.g., butene-1, pentene-1, hexene-1 and octene-1). In more detail, in the case of using polyethylene, any polyethylene of low-density, medium-density or high-density can be employed. When a linear low-density polyethylene is employed as polyethylene, the linear low-density polyethylene generally has a melt index (MI) within the range of 0.1–20 g/10 min., a density within the range of 0.900–0.940 g/cm$^3$, a melting point within the range of 110°–130° C., and molecular-weight distribution (weight-average/number-average) within the range of 1.1–5. The linear low-density polyethylene generally has high mechanical strength at low temperatures, and the resulting modified product has such physical properties. Accordingly, in the case of using such linear low-density polyethylene, a modified product having high mechanical strength at low temperatures can be obtained. When a polypropylene is employed as the polyolefin, the polypropylene generally has a melt flow index (MF or MFI) of 5–20 g/10 min. and a density of 0.88–0.92 g/cm$^3$.

Maleic anhydride is generally employed in the amount of $1 \times 10^{-3}$ to $1 \times 10^{-6}$ mol., preferably $5 \times 10^{-4}$ to $1 \times 10^{-5}$ mol., per 1 g. of polyolefin. When the amount of maleic anhydride exceeds $1 \times 10^{-3}$ mol., the graft efficiency of maleic acid sometimes decreases, and unreacted maleic anhydride remains in a large amount so as to give an unfavorable effect to the physical properties of the resulting modified product. When the amount of maleic anhydride is less than $1 \times 10^{-6}$ mol., the modification with the maleic anhydride is unsatisfactory, and accordingly the resulting modified product is not sufficiently improved in the adhesiveness.

As the case of using a maleic acid-modified polyolefin practically, there are known two procedures, that is, a procedure of using a modified polyolefin per se which is obtained by modification with a relatively small amount of maleic acid, and a procedure of using a modified polyolefin obtained by modification with a relatively large amount of maleic acid in the form of a mixture with an unmodified polyolefin. When the resulting maleic acid-modified polyolefin is used by itself, that is the former case, maleic anhydride is preferably employed in the amount of not more than $1 \times 10^{-4}$ mol per 1 g. of polyolefin. When the resulting maleic acid-modified polyolefin is used in the mixture with unmodified polyolefin, maleic anhydride is preferably employed in an amount of not less than $3 \times 10^{-5}$ mol. per 1 g. of polyolefin. In the latter case (namely, when the resulting maleic acid-modified polyolefin is used in the mixture with unmodified polyolefin), the amount of maleic anhydride is generally within the range of $5 \times 10^{-6}$ to $5 \times 10^{-5}$ mol. per 1 g. of polyolefin in the final state.

In the present invention, as catalyst for accelerating graft polymerization reaction of maleic anhydride to the above-described polyolefin, there is employed a compound having the following formula (I):

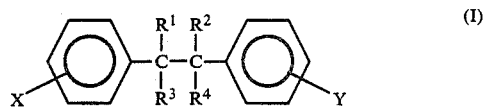

in which each of $R^1$, $R^2$, $R^3$ and $R^4$ in an alkyl group having 1–6 carbon atoms; and each of X and Y is any one of a hydrogen atom, an alkyl group having 1–6 carbon atoms and a halogen atom.

In the formula (I), $R^1$, $R^2$, $R^3$ and $R^4$ may be the same as or different from each other. Likewise, X and Y may be the same as or different from each other.

Examples of the compounds having the formula (I) include 2,3-dimethyl-2,3-diphenylbutane, 2,3-diethyl-2,3-diphenylbutane, 2,3-dimethyl-2,3-di(p-methylphenyl)butane and 2,3-dimethyl-2,3-di(bromophenyl)butane.

The catalyst having the formula (I) is preferably employed in an amount of $1 \times 10^{-3}$ to $1 \times 10^{-6}$ mol., more preferably $1 \times 10^{-4}$ to $1 \times 10^{-6}$ mol., per 1 g. of polyolefin. The molar ratio between the catalyst having the formula (I) and maleic anhydride is preferably within the range of 1 to 0.01, more preferably 0.5 to 0.1. Even if the amount of the catalyst is more than $1 \times 10^{-3}$ mol, substantial increase of the graft efficiency cannot be attained. However, the value of the upper limit is a preferable upper limit value only from the viewpoint of the function of catalyst for the graft reaction. The compound having the formula (I) also serves as a flame retardant-assisting agent for resins. Accordingly, if the compound is employed not only as catalyst but also as the flame retardant-assisting agent for the resulting modified product, the amount thereof may exceed the upper limit defined above. When the compound is employed as the catalyst and the flame retardant-assisting agent, the amount varies depending upon the kinds of the main flame-retardant employed, but is generally within the range of 0.1 to 1% by weight of the amount of resin. When the amount of the compound having the formula (I) is less than $1 \times 10^{-6}$ mol., the graft efficiency decreases and the graft polymerization reaction requires a long period of time.

Graft polymerization reaction is generally performed by heating a mixture of the above-described compounds, after mixing those or in mixing procedure, to a temperature at which polyolefin becomes molten, under kneading the mixture. Alternatively, the above-stated compounds are dissolved or suspended in an appropriate solvent to perform the graft polymerization reaction.

The temperature for the graft polymerization is generally set to the range of above the melting point and below the decomposition temperature of the polyolefin employed. For instance, the temperature is within the range of 110° to 280° C. in the case of using a linear low-density polyethylene, and the temperature is within the range of 140° to 280° C. in the case of using polypropylene. The reaction time required for the graft polymerization reaction generally is 0.1 to 100 min.

The mixing procedure can be performed, for example, by using a conventional mixing apparatus such as Henschel mixer.

As the melting and kneading device for carrying out the graft polymerization reaction, a conventional melting and kneading device can be employed. For instance, a single-axis extruder can be mentioned. The melting and kneading procedure is preferably carried out in an atmosphere inert to polyolefin such as a nitrogen gas atmosphere.

The maleic acid-modified polyolefin prepared as described above generally has a graft efficiency (i.e., graft ratio) of 90–100% [(graft-polymerized maleic anhydride/maleic anhydride employed)×100]. In the process of the invention, the conditions required for the reaction are relatively simple, and the obtained maleic acid-modified polyolefin has a high graft efficiency. In the obtained maleic acid-modified polyolefin, maleic acid is graft-polymerized to polyolefin in the amount ranging from $1 \times 10^{-3}$ to $1 \times 10^{-6}$ mol., preferably $1 \times 10^{-3}$ to $1 \times 10^{-6}$ mol., per 1 g. of polyolefin.

It is presumed that the mechanism of reaction initiation of the catalyst having the formula (I) is caused by a radical which generates by breakage of the carbon-carbon bonding in the center of the formula (I) of the catalyst in the course of reaction. In the invention utilizing the catalyst having the formula (I), the graft polymerization reaction starts more moderately and proceeds more selectively, as compared with the conventional reaction using peroxide. Accordingly, the cross-linking reaction or decomposition reaction of polyolefin is less induced as compared with the conventional reaction, and as a result the resulting modified polyolefin has the excellent physical properties of the unmodified polyolefin. For instance, when a linear low-density polyethylene is employed, the modified product thereof has a high mechanical strength at low temperatures.

As compared with the case of using peroxide, the variation of melt index caused by the modification is smaller, and the obtained modified product shows a melt index only slightly different from that of the polyolefin employed as a starting material. The melt index varies depending upon various factors, and it is difficult to mention definitely the cause of the phenomenon of small variation in melt index. However, it is presumed that the phenomenon is caused by at least less occurrence of the crosslinking reaction and decomposition reaction. Since the occurrence of the crosslinking reaction and decomposition reaction is very rare in the process of the invention, there are hardly brought about various problems such as occurrence of fish-eye or broadening of molecular-weight distribution, which are serious problems in the conventional modification with maleic acid. Further, the modified product obtained according to the process of the invention shows high moldability.

The maleic acid-modified polyolefin of the invention also shows prominently excellent adhesiveness with metals such as iron, TFS (Tin Free Steel) and aluminum as well as other resins such as nylon. That is, the modified product of the invention shows prominently higher bonding strength (i.e., adhesiveness) as compared with the conventional modified product prepared using peroxide, provided that the amount of graft-polymerized maleic acid is the same as each other.

In addition, the maleic acid-modified polyolefin of the invention hardly produces any troublesome odor caused by the decomposition product which is produced by action of peroxide, or rarely shows yellowing caused by decomposition product (or peroxide itself), because no peroxide is employed in the graft polymerization reaction of the invention.

When the graft polymerization reaction is complete, the compound having the formula (I) returns to its original form and is automatically introduced into the modified product. The compound having the formula (I) also serves as flame retardant-assisting agent which imparts flame retardance to polyolefin by using in combination with a known flame-retardant for polyolefin such as hexabromocyclododecane and 2,3-tris(dibromopropylene)phosphate.

The examples and the comparison examples of the present invention are given below.

In the following examples and comparison examples, the brittleness temperature is measured according to the the following brittleness test at low temperature.

BRITTLENESS TEST AT LOW TEMPERATURE

Brittleness temperature was measured according to the method defined in JIS-K-7216. Samples given with a notch of 2 mm were used in the test.

EXAMPLE 1

To a linear low-density polyethylene (LLDPE) [melt index(MI): 2.0 g/10 min. (measuring temperature: 190° C.), density: 0.919 g/cm³, melting point: 123° C., molecular-weight distribution (Mw/Mn): 3, butene-1 content: 4 wt.%] were added $0.3 \times 10^{-4}$ mol. of maleic anhydride and $0.096 \times 10^{-4}$ mol. of 2,3-dimethyl-2,3-diphenylbutane(Di-Cumyl), per 1 g. of LLDPE, and they were mixed in a Henschel mixer. The mixture was then introduced into a single axis extruder (screw diameter: 50 mm, L/D=24), and subjected to melting and kneading at 240° C. for one minute of residence time in a nitrogen gas atmosphere, to prepare a maleic acid-modified polyethylene (maleic acid-modified linear low-density polyethylene).

In the obtained maleic acid-modified polyethylene (modified product), maleic anhydride was graft-polymerized in the amount of $0.29 \times 10^{-4}$ mol. per 1 g. of LLDPE. The maleic acid-modified polyethylene had MI of 1.5 g/10 min, density of 0.919 g/cm$^3$ and melting point of 123° C.

Thus obtained modified product was subjected to the above-described brittleness test at low temperaures. The brittleness temperature of the modified product was −65° C. The brittleness temperature of LLDPE as the starting material was −61° C.

COMPARISON EXAMPLE 1

The procedure of Example 1 was repeated except for using tert-butyl hydroperoxide instead of 2,3-dimethyl-2,3-diphenylbutane and setting a heating temperature to 220° C., to prepare a maleic acid-modified polyethylene.

In the obtained maleic acid-modified polyethylene (modified product), maleic anhydride was graft-polymerized in the amount of $0.23 \times 10^{-4}$ mol. per 1 g. of LLDPE. The maleic acid-modified polyethylene had MI of 0.7 g/10 min, density of 0.919 g/cm$^3$ and melting point of 123° C.

COMPARISON EXAMPLE 2

The procedure of Example 1 was repeated except for using $0.024 \times 10^{-4}$ mol. of tert-butyl peroxylaurate instead of 2,3-dimethyl-2,3-diphenylbutane and setting a heating temperature to 200° C., to prepare a maleic acid-modified polyethylene.

In the obtained maleic acid-modified polyethylene (modified product), maleic anhydride was graft-polymerized in the amount of $0.28 \times 10^{-4}$ mol. per 1 g. of LLDPE. The maleic acid-modified polyethylene had MI of 0.6 g/10 min, density of 0.919 g/cm$^3$ and melting point of 123° C.

COMPARISON EXAMPLE 3

The procedure of Example 1 was repeated except for using $0.048 \times 10^{-4}$ mol. of lauroyl peroxide instead of 2,3-dimethyl-2,3-diphenylbutane and setting a heating temperature to 200° C., to prepare a maleic acid-modified polyethylene.

In the obtained maleic acid-modified polyethylene (modified product), maleic anhydride was graft-polymerized in the amount of $0.23 \times 10^{-4}$ mol. per 1 g. of LLDPE. The maleic acid-modified polyethylene had MI of 0.7 g/10 min, density of 0.919 g/cm$^3$ and melting point of 123° C.

EVALUATION ON ADHESIVENESS (1) Adhesiveness to surface of polished steel sheet Each of the maleic acid-modified polyolefins prepared in Example 1 and Comparison Examples 1 to 3 were subjected to compression molding, to give a sheet of 0.15 mm thick.

Independently, a steel sheet (SS41 polished steel, 6×50×150 mm) having been degreased with trichloroethylene was heated to 160° C. on a heating plate. On the heated steel sheet was placed the above-mentioned modified polyolefin sheet (0.15×50×150 mm), and the polyolefin sheet was fused to the steel sheet for one minute. Subsequently, a polyethylene sheet (2×50×150 mm) having been formed by molding a low-density polyethylene having MI of 0.1 g/10 min. was also superposed on a surface of the modified polyolefin sheet. On the polyethylene sheet was placed a weight of 5 kg. for 3 min., so as that the modified polyolefin sheet was bonded to the steel sheet. Then the modified polyolefin sheet combined with the steel sheet was put into water and allowed for cooling. Thus, a test sheet for peel test was prepared.

The test sheet was cut to give a test strip having width of 10 mm and length of 150 mm. The test strip was measured on the peel strength at peel rate of 50 mm and peel angle of 90° by means of an Instron tensile strength testing machine.

The results are set forth in Table 1.

(2) Adhesiveness to surface of chromate-treated steel sheet

Each of the maleic acid-modified polyolefins prepared in Example 1 and Comparison Examples 1 to 3 were subjected to compression molding, to give a sheet of 0.15 mm thick.

Independently, a steel sheet (SS41 polished steel, 6×50×150 mm) having been degreased with trichloroethylene was treated with chromate at 60° C. to form a chromate-treated layer of approx. 50 μm thick on a surface of the steel sheet. The steel sheet having the chromate-treated layer thereon was heated to 160° C. on a heating plate. On the heated steel sheet was placed the above-mentioned modified polyolefin sheet (0.15×50×150 mm), and the polyolefin sheet was fused to the steel sheet for one minute. Subsequently, a polyethylene sheet (2×50×150 mm) having been formed by molding a low-density polyethylene having MI of 0.1 g/10 min. was also superposed on a surface of the modified polyolefin sheet. On the polyethylene sheet was placed a weight of 5 kg. for 3 min., so as that the modified polyolefin sheet was bonded to the steel sheet. Then the modified polyolefin sheet combined with the steel sheet was put into water and allowed for cooling. Thus, a test sheet for peel test was prepared.

The test sheet was cut to give a test strip having width of 10 mm and length of 150 mm. The test strip was measured on the peel strength at peel rate of 50 mm and peel angle of 90° by means of an Instron tensile strength testing machine.

The results are set forth in Table 1.

(3) Adhesiveness to surface of epoxy resin-coated steel sheet 100 parts by weight of a bisphenol A-type epoxy resin (epoxy equivalent: 190) and 50 parts by weight of Epomate B-002 (trade name, curing agent, available from Shell Chemical Co., Ltd.) were mixed to prepare a thermosetting epoxy resin. The thermosetting epoxy resin was blushed onto a steel sheet (SS41 polished steel, 6×50×150 mm) having been degreased with trichloroethylene and then thermoset, to form an epoxy resin layer of approx. 60 μm thick on the steel sheet.

Then, the procedure of the above-described test (2) was repeated except for using the above-obtained epoxy resin-coated steel sheet instead of the chromate-treated steel sheet, to prepare a test strip. The test strip was evaluated on the peel strength in the same manner as described in the test (2).

The results are set forth in Table 1.

TABLE 1

| | Adhesivness to Steel (kg/10 mm) | | |
|---|---|---|---|
| | (1) | (2) | (3) |
| Example 1 | 11 | 22 | not peeled |
| Com. Example 1 | 8 | 16 | 19 |
| Com. Example 2 | 6 | 11 | 19 |
| Com. Example 3 | 8 | 13 | 18 |

(4) Adhesiveness to surface of TFS sheet

A maleic acid-modified polyolefin sheet prepared in the same manner as described above was sandwiched between two TFS (Tin Free Steel, 0.18×50×100 mm) having been degreased with acetone. On thus sandwiched modified polyolefin sheet was placed a weight of 1 kg. and placed in an oven heated at 220° C. for 5 min., so that the polyolefin sheet was bonded to the TFS sheet. Then the sheet combined with TFS sheet was put into water and allowed for cooling. Thus, a test sheet for peel test was prepared.

The test sheet was cut to give a test strip having width of 20 mm and length of 100 mm. The test strip was measured on the peel strength at peel rate of 10 mm and peel angle of 180° by means of an Instron tensile strength testing machine.

The measured value was converted to a value based on the peel test using a test strip having width of 10 mm.

The results are set forth in Table 2.

(5) Adhesiveness to surface of aluminum plate (I)

An aluminum plate (0.25×50×180 mm) having been degreased with acetone was heated to 160° C. on a heating plate. On the heated aluminum plate was placed the above-described maleic acid-modified polyolefin sheet (0.15×50×150 mm), and the sheet was fused to the aluminum plate for one minute. Subsequently, a polyethylene sheet (2×50×150 mm) having been formed by molding a low-density polyethylene having MI of 0.1 g/10 min. was then superposed on a surface of the modified polyolefin sheet. On the polyethylene sheet was placed a weight of 6 kg. for 2 min., so that the modified polyolefin sheet was bonded to the aluminum plate. Then, the modified polyolefin sheet combined with aluminum plate was put into water and allowed for cooling. Thus, a test sheet for peel test was prepared.

The test sheet was cut to give a test strip having width of 10 mm and length of 180 mm. The test strip was measured on the peel strength at peel rate of 100 mm and peel angle of 180° by means of an Instron tensile strength testing machine.

The results are set forth in Table 2.

(6) Adhesiveness to surface of aluminum plate (II)

A maleic acid-modified polyolefin sheet prepared in the same manner as described above was sandwiched between two flexible aluminum plate (each: 0.18×50×100) having been degreased with acetone. On the sandwiched modified polyolefin sheet was placed a weight of 1 kg. and placed in an oven heated at 220° C. for 5 min., so that the sheet was bonded to the aluminum plates. Then the sheet with aluminum plates was put into water and allowed for cooling. Thus, a test sheet for peel test was prepared.

The test sheet was cut to give a test strip having width of 20 mm and length of 100 mm. The test strip was measured on the peel strength at peel rate of 10 mm and peel angle of 180° by means of an Instron tensile strength testing machine.

The measured value was converted to a value based on the peel test using a test strip having a width of 10 mm.

The results are set forth in Table 2.

TABLE 2

| | Adhesiveness to TFS and Al (kg/10 mm) | | |
|---|---|---|---|
| | (4) | (5) | (6) |
| Example 1 | 16 | 6 | 6 |
| Com. Example 1 | 11 | 4 | 4 |
| Com. Example 2 | 9 | 4 | 4 |
| Com. Example 3 | 10 | 4 | 4 |

(7) Adhesiveness to nylon film

A laminated sheet of three layers comprising an outer layer of nylon film (available from Ube Industries, Ltd., grade name: 1022FD-1) having thickness of 30 μm, an intermediate layer of maleic acid-modified polyolefin having thickness of 20 μm, and an inner layer of low-density polyethylene (available from Ube Industries, Ltd., grade name: F022) having a thickness of 50 μm was prepared by using an inflation molding machine (die diameter: 100 mm, lip clearance: 1.25 mm) under the conditions of BUR of 2.0, flat width of 310 mm, tensile rate of 15 m/min. and water cooling inflation. The temperature of the extrusion molding machine was approx. 240° C. on the outer layer and approx. 180° C. on the intermediate and inner layers.

The obtained laminated sheet was subjected to T-type peel test to evaluate the peel strength by means of an Instron tensile strength testing machine at peel rate of 50 mm according to the method defined in JIS-K-6854.

In the laminated sheet prepared using the maleic acid-modified polyethylene obtained in Example 1, all layers were bonded fixedly to each other and any layer did not peel off from other layers.

The maleic acid-modified polyolefin obtained in Comparison Example 1 was used to try to form a laminated sheet, but no laminated sheet was obtained under the same conditions as the case of using the maleic acid-modified polyolefin of Example 1, because the pressure applied to resin became more than 350 kg/cm$^2$ to cause motor trip.

The maleic acid-modified polyolefin obtained in Comparison Example 1 was used to prepare a laminated sheet of the same form as described above by increasing the temperature of the extrusion molding machine on the intermediate layer. According to the peel test, each layer peeled off from each other at 1500 g/25 mm in the obtained laminated sheet.

EVALUATION ON ODOR

Each of the maleic acid-modified polyethylene prepared by Example 1 and Comparison Example 1 to 3 was contained in a closed container, and the container was heated to 80° C. for one hour. The odor produced in the container was ranked by ten testers according to the strength to perform a blind test.

It was confirmed by all of the testers that the maleic acid-modified polyolefin prepared in Example 1 gave the weakest odor.

EVALUATION ON YELLOWING

Each of the maleic acid-modified polyethylene prepared by Example 1 and Comparison Example 1 to 3 was measured on the yellowness by an yellowness measuring device (ND1001DP, produced by Japan Denshoku Co., Ltd.).

It was confirmed that the yellowness of the maleic acid-modified polyethylene prepared by Example 1 was lower by one rank than the maleic acid-modified polyethylenes prepared by Comparison Examples 1 to 3.

EXAMPLE 2

The procedure of Example 1 was repeated except for using polypropylene having MI of 1 g/10 min. (measuring temperature: 230° C.) and density of 0.91 g/cm$^3$ instead of LLDPE, to prepare a maleic acid-modified polypropylene.

In the obtained maleic acid-modified polypropylene, maleic anhydride was graft-polymerized in an amount of $0.21 \times 10^{-4}$ mol. per 1 g. of polypropylene. The maleic acid-modified polypropylene had MI of 4.8 g/10 min. and density of 0.91 g/cm$^3$.

COMPARISON EXAMPLE 4

The procedure of Example 2 was repeated except for using $0.96 \times 10^{-4}$ mol. of tert-butyl peroxybenzoate instead of 2,3-dimethyl-2,3-diphenylbutane and setting a heating temperature to 220° C., to prepare a maleic acid-modified polypropylene.

In the obtained maleic acid-modified polypropylene, maleic anhydride was graft-polymerized in an amount of $0.11 \times 10^{-4}$ mol. per 1 g. of polypropylene. The maleic acid-modified polypropylene had MI of 52.1 g/10 min. and density of 0.91 g/cm$^3$.

We claim:

1. An improved process for the preparation of a maleic acid-modified polyolefin comprising graft-polymerizing maleic anhydride to a polyolefin in its molten state; said maleic anhydride being employed in an amount from $1 \times 10^{-3}$ to $1 \times 10^{-6}$ mol. per 1 g. of the polyolefin, and said polyolefin being selected from the group consisting of polyethylene, polypropylene and linear low-density polyethylene wherein the graft polymerization is carried out in the presence of from $1 \times 10^{-3}$ to $1 \times 10^{-6}$ mol. per 1 g. of the polyolefin of a compound having the formula (I):

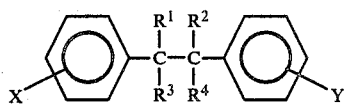

(I)

in which each of R$^1$, R$^2$, R$^3$ and R$^4$ is independently an alkyl group having 1–6 carbon atoms; and each of X and Y is independently selected from the group consisting of hydrogen atom, an alkyl group having 1–6 carbon atoms and a halogen atom.

2. The process of claim 1, wherein the molar ratio of the compound having the formula (I) to the maleic anhydride is from 1 to 0.01.

3. The process of claim 1, wherein the amount of the compound having the formula (I) is from $1 \times 10^{-4}$ to $1 \times 10^{-6}$ mol. per 1 g. of the polyolefin.

4. The process of claim 1, wherein the molar ratio of the compound having the formula (I) to the maleic anhydride is from 0.5 to 0.1.

5. The process of claim 1, wherein the compound having the formula (I) is selected from the group consisting of 2,3-dimethyl-2,3-diphenylbutane, 2,3-diethyl-2,3-diphenylbutane, 2,3-dimethyl-2,3-di(p-methoxyphenyl)butane, and 2,3-dimethyl-2,3-di(bromophenyl)butane.

6. The process of claim 2, wherein the amount of the compound having the formula (I) is from $1 \times 10^{-4}$ to $1 \times 10^{-6}$ mol. per 1 g. of the polyolefin.

7. The process of claim 6, wherein the compound having the formula (I) is selected from the group consisting of 2,3-dimethyl-2,3-diphenylbutane, 2,3-diethyl-2,3-diphenylbutane, 2,3-dimethyl-2,3-di(p-methoxyphenyl)butane, and 2,3-dimethyl-2,3-di(bromophenyl)butane.

8. The process of claim 2, wherein the compound having the formula (I) is selected from the group consisting of 2,3-dimethyl-2,3-diphenylbutane, 2,3-diethyl-2,3-diphenylbutane, 2,3-dimethyl-2,3-di(p-methoxyphenyl)butane, and 2,3-dimethyl-2,3-di(bromophenyl)butane.

9. The process of claim 3, wherein the compound having the formula (I) is selected from the group consisting of 2,3-dimethyl-2,3-diphenylbutane, 2,3-diethyl-2,3-diphenylbutane, 2,3-dimethyl-2,3-di(p-methoxyphenyl)butane, and 2,3-dimethyl-2,3-di(bromophenyl)butane.

10. The process of claim 3, wherein the molar ratio of the compound having the formula (I) to the maleic anhydride is from 0.5 to 0.1.

11. The process of claim 7, wherein the molar ratio of the compound having the formula (I) to the maleic anhydride is from 0.5 to 0.1.

12. The process of claim 8, wherein the molar ratio of the compound having the formula (I) to the maleic anhydride is from 0.5 to 0.1.

13. The process of claim 9, wherein the molar ratio of the compound having the formula (I) to the maleic anhydride is from 0.5 to 0.1.

* * * * *